(12) United States Patent
Rydin

(10) Patent No.: US 6,349,922 B1
(45) Date of Patent: Feb. 26, 2002

(54) VALVE WITH VALVE BODY WHICH IS NON-LINEARLY MOVABLE RELATIVE TO A VALVE SEAT

(75) Inventor: Göran Rydin, Täby (SE)

(73) Assignee: Siemens Elema AB, Solna (SE)

( * ) Notice: Subject to any disclaimer, the term of this patent is extended or adjusted under 35 U.S.C. 154(b) by 0 days.

(21) Appl. No.: 09/287,314

(22) Filed: Apr. 7, 1999

(30) Foreign Application Priority Data

May 11, 1998 (SE) ............................................... 9801624

(51) Int. Cl.[7] ............................................. F16K 31/04
(52) U.S. Cl. ............ 251/129.11; 251/266; 74/424.8 VA
(58) Field of Search ........................ 251/129.11, 331, 251/264, 266; 74/424.8 VA

(56) References Cited

U.S. PATENT DOCUMENTS

| | | | | |
|---|---|---|---|---|
| 389,603 A | * | 9/1888 | Schutz et al. | 74/424.8 VA |
| 2,189,330 A | * | 2/1940 | Smith | 74/424.8 VA |
| 3,691,843 A | * | 9/1972 | Gorgens et al. | 73/701 |
| 4,440,038 A | * | 4/1984 | Potter | 74/424.8 R |
| 4,503,888 A | * | 3/1985 | Brovold | 251/129.11 X |
| 4,986,085 A | * | 1/1991 | Tischer | 251/129.11 X |
| 5,052,430 A | * | 10/1991 | Trautwein | 74/424.8 VA |
| 5,052,656 A | * | 10/1991 | Katayama | 251/129.11 |
| 5,072,729 A | * | 12/1991 | DeVries | 128/204.23 |
| 5,265,594 A | | 11/1993 | Olsson et al. | |
| 5,295,662 A | * | 3/1994 | Yamaji et al. | 251/331 |
| 5,419,530 A | * | 5/1995 | Kumar | 251/95 |
| 5,518,015 A | | 5/1996 | Berget et al. | |
| 5,776,142 A | * | 7/1998 | Gunderson | 606/108 |
| 5,843,050 A | * | 12/1998 | Jones et al. | 606/108 |
| 5,890,393 A | * | 4/1999 | Ohta | 74/424.8 VA |
| 5,906,619 A | * | 5/1999 | Olson et al. | 606/108 |
| 6,056,770 A | * | 5/2000 | Epstein et al. | 606/213 |

FOREIGN PATENT DOCUMENTS

EP 0 266 963 11/1988

* cited by examiner

Primary Examiner—John Rivell
Assistant Examiner—Meredith H. Schoenfeld
(74) Attorney, Agent, or Firm—Schiff Hardin & Waite

(57) ABSTRACT

A valve for regulating a gas flow has a valve seat and a valve body, movable against the valve seat. The valve achieves high accuracy, a wide dynamic range and high operating reliability by causing the valve body substantially only to move axially against the valve seat and by using a stepper motor to actuate the valve body's axial movement against the valve seat with a non-linearly threaded engagement between the stepper motor and valve body so that the valve body performs continuous, non-linear, axial movement against the valve seat.

6 Claims, 2 Drawing Sheets

VALVE WITH VALVE BODY WHICH IS NON-LINEARLY MOVABLE RELATIVE TO A VALVE SEAT

BACKGROUND OF THE INVENTION

1. Field of the Invention

The present invention is directed to a valve for regulating a gas flow of the type having a valve body which is movable against a valve seat to regulate a degree of opening of the valve, thereby regulating the gas flow through the valve.

2. Description of the Prior Art

Valves for regulating gases are available in many different versions, all with varying performance (e.g. in terms of dynamic regulatory range and accuracy), operating reliability and operating costs.

The aforementioned properties are important in certain applications, such as valves in ventilators for respiratory care. Such valves must have a wide dynamic range and high accuracy for correct ventilation of all patient categories. Their operating reliability must be great and operating costs low.

One such valve is described in U.S. Pat. No. 5,265,594. This known valve is an electromagnetic, servo-controlled membrane valve.

Although this known valve displays excellent performance and operating reliability, it is also relatively complex and energy demanding.

SUMMARY OF THE INVENTION

An object of the present invention is to provide a valve with a design, offering basically the same high performance and high operating reliability as the aforementioned conventional valve, but which is less complex and employs a less complicated regulatory system with lower operating costs.

The above object is achieved in accordance with the principles of the present invention in a valve for regulating a gas flow having a valve body movable relative to a valve seat, wherein the valve body is constrained so as to move only substantially axially against the valve seat, and wherein a stepper motor is used to actuate axial movement of the valve body relative to the valve seat, with the stepper motor and the valve body having a non-linear engagement so that the valve body performs continuous, non-linear, axial movements relative to the valve seat.

Regulation is facilitated by the non-linear connection of the valve body to a stepper motor. The valve body's continuous non-linear movement against the valve seat results in a large dynamic range for the stepper motor within a small regulatory area of movement, and accuracy at small flows is retained. The stepper motor is also powerful and able to cope with very large counter-pressures without valve leakage.

"Continuous non-linear movement" as used herein means movement of a type produced by rotation of a non-linear screw-thread, such as a screw-thread wherein the respective flights have different spacings or inclinations relative to one another, as opposed to a conventional screw-thread with step-wise uniformly spaced and identically inclined flights.

DESCRIPTION OF THE PREFERRED EMBODIMENTS

Figure 1:
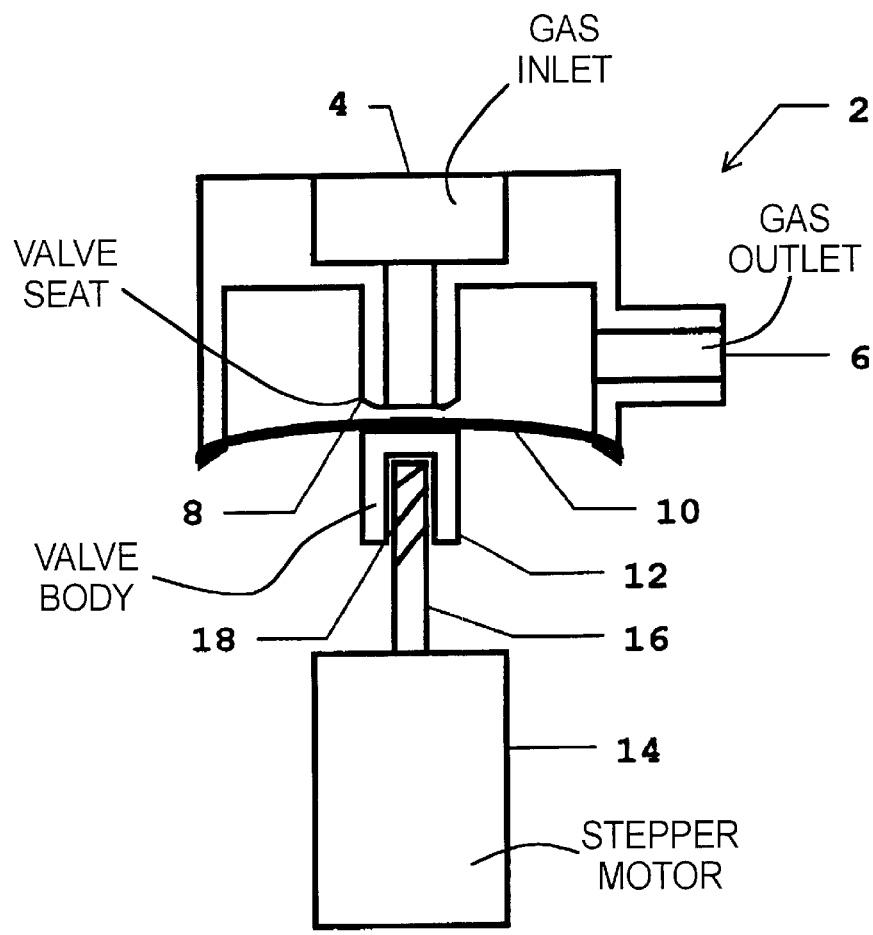
FIG. 1 shows one embodiment of the valve according to the invention.

FIG. 1 shows an embodiment of a valve according to the invention. The valve 2 has an inlet 4 for unregulated gas and an outlet 6 for regulated gas. The valve 2 has a valve seat 8 against which a membrane 10 can be pressed to a greater or lesser degree by a valve body 12 to regulate the flow of gas through the valve 2.

The position of the valve body 12 in relation to the valve seat 8 is regulated, in turn, by a stepper motor 14 which has a non-linear engagement with the valve body 12. In the embodiment of FIG. 1 this non-linear engagement is produced by a shaft 16 connected between the stepper motor 14 and the valve body 12. The shaft 16 is rotated by the stepper motor 14 and has a continuous, non-linear thread 18 enabling accurate regulation over a wide flow range.

Figure 3:
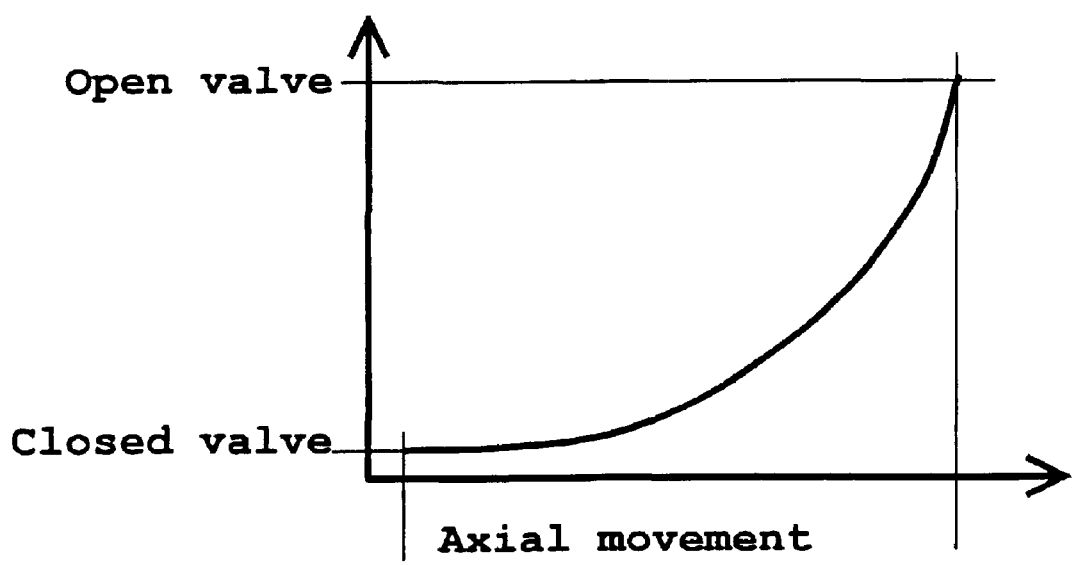
FIG. 3 shows an example of the inventive non-linear movement of a valve body.

The movement produced by the non-linear thread 18 is exemplified in FIG. 3, which shows one possible non-linear curve for the axial movement of the valve body 12 between a position producing an "open" state and a position producing a "closed" state.

The stepper motor 14 is robust and reliable, making the valve 2 particularly suitable for devices used in respiratory care.

Figure 2:
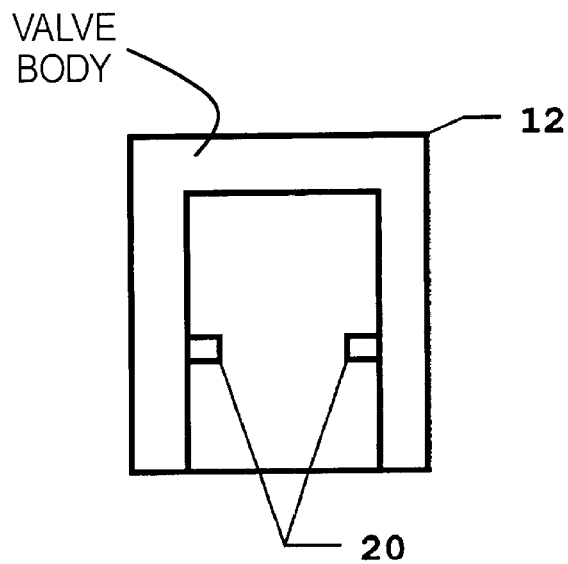
FIG. 2 shows a valve body in the valve according to FIG. 1.

FIG. 2 shows an enlarged view of the valve body 12. Two pins 20 protrude from the inner wall of the valve body 12 and mate with the thread 18 on the shaft 16 of the stepper motor 14 (FIG. 1). This means that the valve body 12 moves primarily only in an axial direction and not in a radial direction.

In FIG. 1 the thread 18 is shown with three turns or flights, but it could also have more turns or, preferably, fewer. In principle, the thread 18 defines the two extreme positions, i.e. positions producing a closed valve and a completely open valve, respectively. The non-linear design should be devised so non-linearity increases with the degree of opening of the valve 2. The shaft 16 preferably rotates through a range of between 0.5 and 2 revolutions in order to move the valve body 12 between its two extreme positions for producing an open state and a closed state, respectively.

The aforementioned non-linear engagement can alternatively be produced by arranging the thread 18 on a coupling part between a shaft and the valve body 12, or the thread 18 can be arranged internally inside the valve body 12. In the latter instance, the shaft should be devised so the valve body 12 moves essentially in an axial direction and not in a radial direction.

Although modifications and changes may be suggested by those skilled in the art, it is the intention of the inventor to embody within the patent warranted hereon all changes and modifications as reasonably and properly come within the scope of his contribution to the art.

I claim as my invention:

1. A valve for regulating a gas flow, comprising:

a valve seat;

a valve body mounted for movement relative to said valve seat, with a variable space between said valve body and said valve seat defining a gas flow;

said valve body being constrained to move substantially only axially relative to said valve seat; and a stepper motor having a shaft with a non-linear thread, producing a non-linear engagement with said valve body for actuating axial movement of said valve body relative to said valve seat, for causing said valve body to perform continuous, non-linear, axial movements relative to said valve seat.

2. A valve as claimed in claim 1 wherein said valve body assumes a first position substantially adjacent to said valve seat for producing a closed valve state and assumes a second position at a distance from said valve seat for producing an open valve state, and wherein said stepper motor rotates said shaft in a range between 0.5 and 2 revolutions to produce movement of said valve body between said first position and said second position.

3. A valve as claimed in claim 1 wherein said valve body comprises a coupling element connected to said stepper motor, said coupling element having a non-linear thread producing said non-linear engagement.

4. A valve as claimed in claim 1 further comprising a membrane disposed between said valve seat and said valve body.

5. A valve for regulating a gas flow, comprising:
a valve seat having an opening therein through which a gas flows;
a valve body; and
a stepper motor having a rotatable shaft on which said valve body is mounted,
said rotatable shaft having a non-linear thread thereon engaging said valve body, said shaft constraining movement of said valve body to only substantially axial movement of said valve body relative to said valve seat, and said non-linear thread on said shaft causing said valve body, when actuated by said stepper motor, to perform continuous, non-linear axial movements relative to said valve seat to regulate said gas flow through said opening in said valve seat.

6. A valve as claimed in claim 5 further comprising a membrane disposed between said valve body and said valve seat.

* * * * *